United States Patent
Sidelkovskiy et al.

(10) Patent No.: US 11,236,701 B2
(45) Date of Patent: *Feb. 1, 2022

(54) CONVERGENT DIVERGENT EXIT NOZZLE FOR A GAS TURBINE ENGINE

(71) Applicant: Raytheon Technologies Corporation, Farmington, CT (US)

(72) Inventors: Dmitriy B. Sidelkovskiy, Ellington, CT (US); Oleg Petrenko, Danbury, CT (US); Robert E. Malecki, Storrs, CT (US); Steven H. Zysman, Amston, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 420 days.

This patent is subject to a terminal disclaimer.

(21) Appl. No.: 16/031,202

(22) Filed: Jul. 10, 2018

(65) Prior Publication Data
US 2019/0017470 A1    Jan. 17, 2019

Related U.S. Application Data

(63) Continuation of application No. 14/817,611, filed on Aug. 4, 2015, now Pat. No. 10,371,092.
(Continued)

(51) Int. Cl.
*F02K 1/78* (2006.01)
*B64D 29/00* (2006.01)
*F02K 1/40* (2006.01)
*F02K 1/52* (2006.01)
*F02K 1/00* (2006.01)
(Continued)

(52) U.S. Cl.
CPC ............. *F02K 1/78* (2013.01); *B64D 29/00* (2013.01); *F02C 3/04* (2013.01); *F02K 1/00* (2013.01); *F02K 1/36* (2013.01); *F02K 1/40* (2013.01); *F02K 1/52* (2013.01); *F02K 1/82* (2013.01);
(Continued)

(58) Field of Classification Search
CPC ........ B64D 29/00; B64D 29/02; B64D 29/04; F02K 1/00; F02K 1/36; F02K 1/40; F02K 1/42; F02K 1/52; F02K 1/78; F02K 1/82; F02K 3/06; F02K 3/077
See application file for complete search history.

(56) References Cited

U.S. PATENT DOCUMENTS 739,567 A    9/1903  White
3,591,087 A    7/1971  Tontini
(Continued)

OTHER PUBLICATIONS

European Search Report for Application No. 15179031.8 dated Jan. 12, 2016.

*Primary Examiner* — Scott J Walthour
(74) *Attorney, Agent, or Firm* — Carlson, Gaskey & Olds, P.C.

(57) ABSTRACT

A nacelle for a gas turbine engine includes a ring shaped body defining a center axis and having a radially outward surface and a radially inward surface. An aft portion of the radially inward surface includes an axially extending convergent-divergent exit nozzle. An axially extending secondary duct passes through the nacelle in the convergent-divergent exit nozzle. The axially extending secondary duct includes an inlet at a convergent portion of the convergent-divergent exit nozzle and an outlet at a divergent portion of the convergent-divergent exit nozzle.

8 Claims, 6 Drawing Sheets

Related U.S. Application Data

(60) Provisional application No. 62/034,899, filed on Aug. 8, 2014.

(51) Int. Cl.
  *F02K 1/82* (2006.01)
  *F02K 1/36* (2006.01)
  *F02K 3/077* (2006.01)
  *F02C 3/04* (2006.01)
  *F02K 3/06* (2006.01)
  *B64D 29/02* (2006.01)
  *B64D 29/04* (2006.01)

(52) U.S. Cl.
  CPC ............... *F02K 3/06* (2013.01); *F02K 3/077* (2013.01); *B64D 29/02* (2013.01); *B64D 29/04* (2013.01)

(56) References Cited

U.S. PATENT DOCUMENTS

| | | |
|---|---|---|
| 4,196,856 A | 4/1980 | James |
| 4,228,651 A | 10/1980 | Mullins |
| 4,447,009 A | 5/1984 | Wiley et al. |
| 6,295,805 B1 | 10/2001 | Lackey et al. |
| 7,805,925 B2 | 10/2010 | Durocher et al. |
| 7,886,518 B2 | 2/2011 | Moniz et al. |
| 10,371,092 B2 * | 8/2019 | Sidelkovskiy ............ F02C 3/04 |
| 2010/0043393 A1 | 2/2010 | Zamora et al. |
| 2010/0050651 A1 | 3/2010 | Dindar et al. |
| 2010/0242433 A1 | 9/2010 | Prat et al. |
| 2011/0127353 A1 | 6/2011 | Letay et al. |
| 2015/0033747 A1 | 2/2015 | Leyko et al. |

\* cited by examiner

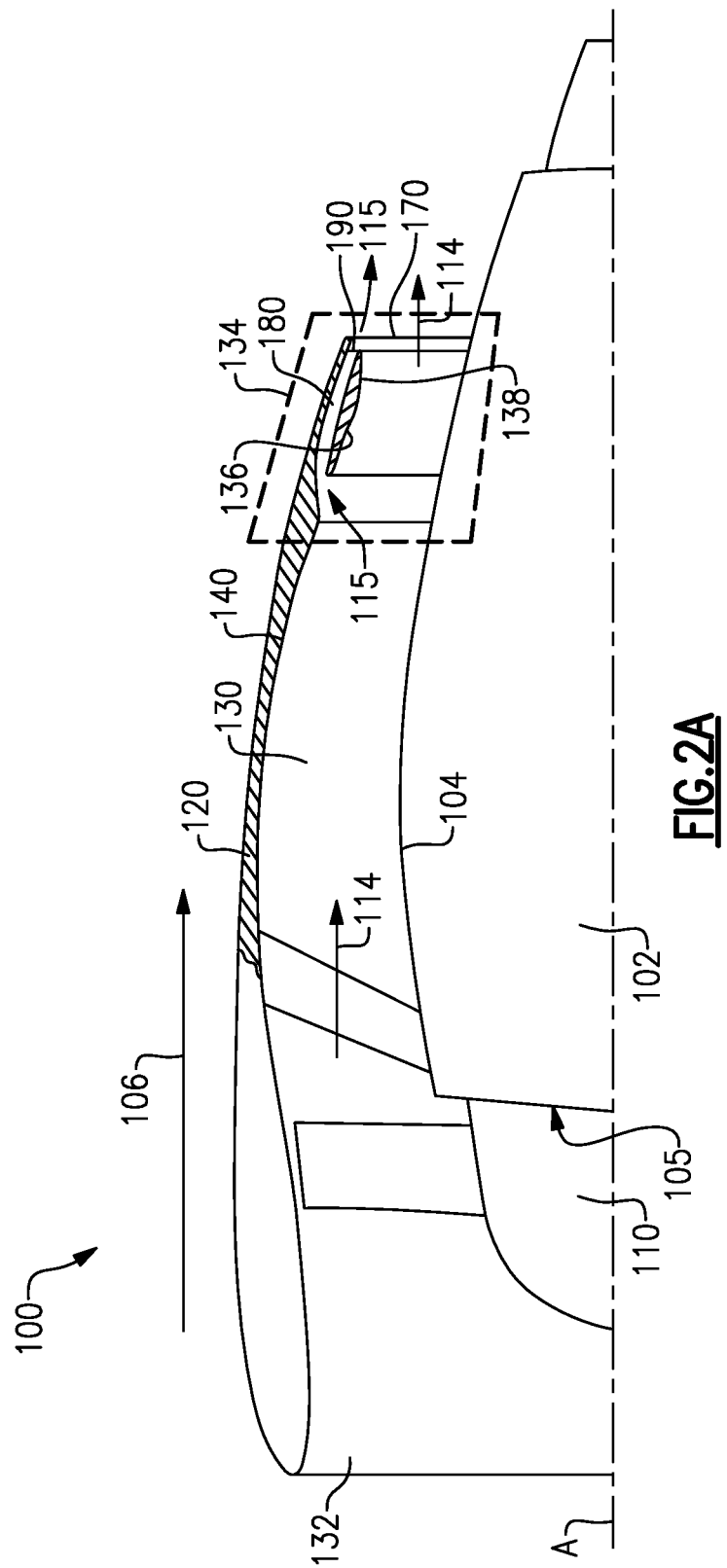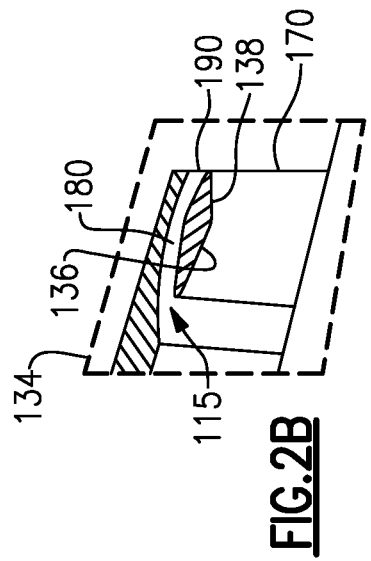
FIG.2A
FIG.2B

CONVERGENT DIVERGENT EXIT NOZZLE FOR A GAS TURBINE ENGINE

CROSS-REFERENCE TO RELATED APPLICATION

This application is a continuation of U.S. patent application Ser. No. 14/817,611, filed on Aug. 4, 2015, which claims priority to U.S. Provisional Application No. 62/034,899 filed on Aug. 8, 2014.

TECHNICAL FIELD

The present disclosure relates generally to bypass duct exhaust nozzles for a gas turbine engine, and more specifically to a convergent divergent exit nozzle for the same.

BACKGROUND

Turbofan engines, such as those used in commercial aircraft, include a fan driven by a shaft. The fan draws air into a compressor portion and a bypass duct. The compressor portion compresses the air and provides the compressed air to a combustor. The air is mixed with fuel and combusted within the combustor. The resultant combustion gasses are expelled from the combustor into a turbine, and expand through the turbine driving the turbine to rotate. At least a portion of the turbine is connected with the shaft and provides rotational force driving the fan to rotate. The air drawn into the bypass duct bypasses the compressor, combustor, and turbine and is expelled from the bypass duct at a bypass duct convergent-divergent exit nozzle.

SUMMARY OF THE INVENTION

A gas turbine engine, according to one exemplary embodiment includes an engine core and a fan driven by the engine core, a nacelle radially surrounding the engine core and the fan, wherein the nacelle defines a bypass passage having a convergent-divergent exit nozzle, wherein the convergent-divergent exit nozzle includes: a primary passage and a secondary passage radially exterior to the primary passage, wherein the secondary passage includes a secondary inlet disposed in a convergent region of the convergent-divergent exit nozzle and a secondary outlet disposed in a divergent region of the convergent-divergent exit nozzle.

In another example of the above gas turbine engine, the secondary passage includes a circumferential ring duct.

In another example of any of the above gas turbine engines, the circumferential ring duct is an unobstructed circumferential ring duct.

In another example of any of the above gas turbine engines, the secondary passage includes a plurality of isolated airflow passages and wherein each of the isolated airflow passages extend a partial length of the secondary passage.

In another example of any of the above gas turbine engines, the plurality of airflow passages are fore of the circumferential ring duct, relative to a fluid flow through the secondary passage.

In another example of any of the above gas turbine engines, the plurality of airflow passages are aft of the circumferential ring duct, relative to a fluid flow through the secondary passage.

Another example of any of the above gas turbine engines includes a plurality of structures disposed circumferentially within the secondary passage, and wherein the plurality of structures supports a portion of the convergent-divergent exit nozzle, the portion being radially inward of the secondary passage.

In another example of any of the above gas turbine engines, the outlet of the secondary passage and an outlet of the convergent-divergent exit nozzle are axially aligned, relative to an axis defined by the gas turbine engine.

In another example of any of the above gas turbine engines, the engine core comprises a compressor, a combustor fluidly connected to the compressor, and a turbine fluidly connected to the combustor, and wherein the engine core is contained within the nacelle.

A nacelle for a gas turbine engine, according to one exemplary embodiment includes a ring shaped body defining a center axis and having a radially outward surface and a radially inward surface, an aft portion of the radially inward surface including an axially extending convergent-divergent exit nozzle, and an axially extending secondary duct passing through the nacelle in the convergent-divergent exit nozzle, the axially extending secondary duct including an inlet at a convergent portion of the convergent-divergent exit nozzle and an outlet at a divergent portion of the convergent-divergent exit nozzle.

In another example of any of the above nacelles, the secondary duct includes a circumferential ring duct.

In another example of any of the above nacelles, the secondary duct includes a plurality of isolated airflow passages and wherein each of the isolated airflow passages extends axially at least a partial axial length of the secondary duct.

In another example of any of the above nacelles, the plurality of airflow passages are fore of the circumferential ring duct, relative to a fluid flow through the secondary duct.

In another example of any of the above nacelles, the plurality of airflow passages are aft of the circumferential ring duct, relative to a fluid flow through the secondary duct.

Another example of any of the above nacelles includes a plurality of structures disposed circumferentially about the axis within the secondary duct, and wherein the plurality of structures supports a portion of the convergent-divergent exit nozzle, the supported portion being radially inward of the secondary duct relative to a main nacelle portion.

In another example of any of the above nacelles, the secondary duct comprises a plurality of structures extending a full axial length of the secondary duct, and wherein the structures define a plurality of divided flow passages within the secondary duct.

In an exemplary embodiment, a method for controlling flow separation in a convergent-divergent nozzle of a gas turbine engine fan duct includes receiving a portion of airflow through a primary fan duct into a secondary passage via a secondary passage inlet in a convergent region of an exit nozzle of the primary fan duct, expelling air from the secondary passage through a secondary passage outlet nozzle, wherein the secondary passage outlet nozzle is positioned at least partially in a divergent region of the exit nozzle of the primary fan duct, thereby altering a flow separation of airflow through the primary fan duct in the divergent region.

A further example of the above described method includes receiving a portion of airflow through the primary fan duct into a secondary passage via a secondary passage inlet in a convergent region of an exit nozzle of the primary fan duct comprises receiving the portion of the airflow into a circumferential ring duct portion of the secondary passage.

A further example of any of the above described method includes splitting the received portion of the air into a plurality of segregated airflows after the received portion of the air has passed through the circumferential ring duct portion.

In a further example of any of the above described methods, receiving a portion of airflow through the primary fan duct into a secondary passage via a secondary passage inlet in a convergent region of an exit nozzle of the primary fan duct comprises receiving the portion of the airflow into a divided duct portion of the secondary passage.

In a further example of any of the above described methods, joining the received portion of the air into a single circumferential ring duct portion of the secondary passage after the received portion of the air has passed through the divided duct portion of the secondary passage.

These and other features of the present invention can be best understood from the following specification and drawings, the following of which is a brief description.

BRIEF DESCRIPTION OF THE DRAWINGS

FIG. 2A schematically illustrates a gas turbine engine including a secondary duct within a bypass duct.

FIG. 2B schematically illustrates a variation of a convergent-divergent exit nozzle of FIG. 2A.

DETAILED DESCRIPTION OF AN EMBODIMENT

Figure 1:
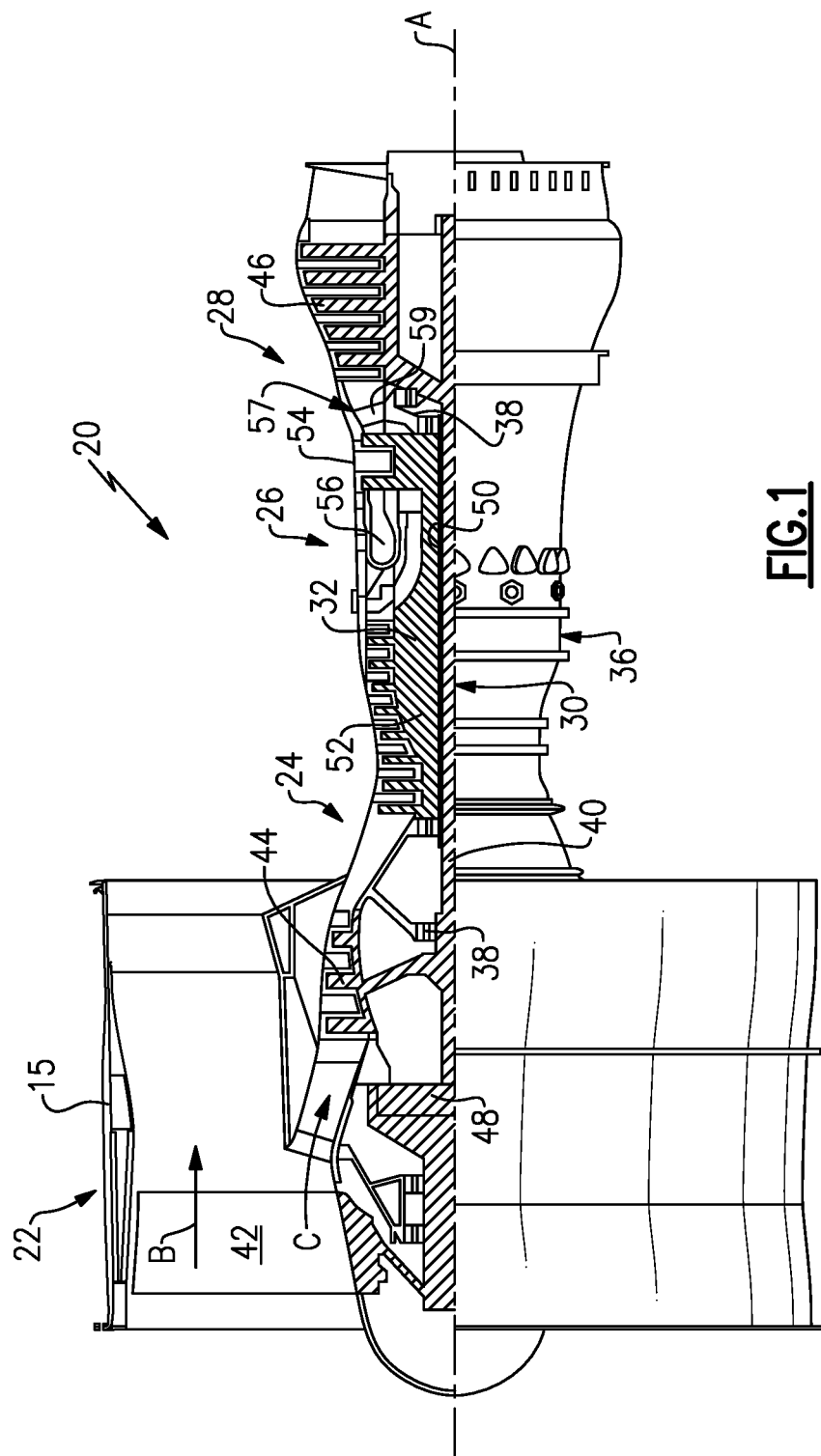
FIG. 1 schematically illustrates a gas turbine engine.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. Alternative engines might include an augmentor section (not shown) among other systems or features. The fan section 22 drives air along a bypass flow path B in a duct defined within a case 15, while the compressor section 24 drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects a fan 42, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive the fan 42 at a lower speed than the low speed spool 30. The high speed spool 32 includes an outer shaft 50 that interconnects a second (or high) pressure compressor 52 and a second (or high) pressure turbine 54. A combustor 56 is arranged in exemplary gas turbine 20 between the high pressure compressor 52 and the high pressure turbine 54. A mid-turbine frame 57 of the engine static structure 36 is arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded over the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of combustor section 26 or even aft of turbine section 28, and fan section 22 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), the geared architecture 48 is an epicyclic gear train, such as a planetary gear system or other gear system, with a gear reduction ratio of greater than about 2.3 and the low pressure turbine 46 has a pressure ratio that is greater than about five. In one disclosed embodiment, the engine 20 bypass ratio is greater than about ten (10:1), the fan diameter is significantly larger than that of the low pressure compressor 44, and the low pressure turbine 46 has a pressure ratio that is greater than about five (5:1). Low pressure turbine 46 pressure ratio is pressure measured prior to inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present invention is applicable to other gas turbine engines including direct drive turbofans.

A significant proportion of thrust is provided by the bypass flow B due to the high bypass ratio. The fan section 22 of the engine 20 is designed for a particular flight condition—typically cruise at about 0.8 Mach and about 35,000 feet. The flight condition of 0.8 Mach and 35,000 ft, with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/sec divided by an industry standard temperature correction of [(Tram ° R)/ (518.7° R)]0.5. The "Low corrected fan tip speed" as disclosed herein according to one non-limiting embodiment is less than about 1150 ft/second.

FIG. 2A schematically illustrates a gas turbine engine 100, such as the gas turbine engine 20 of FIG. 1, including a convergent-divergent exit nozzle 134. Each of the compressor section 24, the combustor section 26 and the turbine section 28 (described above and illustrated in FIG. 1) are contained within an engine core 102. A fan section 110 is positioned fore of a fluid inlet 105 to the engine core 102 and draws air into the engine core 102 and into a bypass duct 130. The bypass duct 130 is defined between an inner surface 104 and an outer surface 140 of the bypass duct 130. The bypass duct outer surface 140 is formed by the inner diameter of the nacelle 120. In some examples, the inner surface 104 is formed by an outer surface of the engine core 102. Air enters the bypass duct 130 at an airflow inlet 132 and exits the bypass duct 130 at an exit nozzle 134. The exit nozzle 134 is positioned at an aft end of the bypass duct 130, relative to fluid flow through the bypass duct 130.

The exit nozzle 134 is a convergent-divergent exit nozzle. At a convergent region 136 of the exit nozzle, the outer diameter 140 of the bypass duct converges toward the inner diameter 104. At a divergent region 138 of the exit nozzle, the outer diameter 140 of the bypass duct diverges away from the inner diameter 104. The particular magnitude of the convergence or the divergence in the convergent-divergent exit nozzle 134 depends on the specifics of the engine 100 and can be determined by one of skill in the art having the benefit of this disclosure. Similarly, one of skill in the art, having the benefit of this disclosure, will understand that convergent-divergent exit nozzles provide beneficial flow properties for the bypass duct 130 relative to non-convergent-divergent nozzles.

In some convergent-divergent nozzles, such as the illustrated exit nozzle 134, the bypass airflow 114 can separate from the outer diameter of 140 of the bypass duct 130 in the divergent region 138 of the convergent-divergent exit nozzle 134 during operation of the gas turbine engine. If the flow separation is too severe (e.g. airflow separates from the outer diameter 140 of the bypass duct 130 by too much) then the mixing between ambient air 106 exterior to the engine 100 and the air exiting the convergent-divergent exit nozzle 134 along the bypass duct 114 can be negatively impacted.

In order to reduce the flow separation at the divergent region 138, the bypass duct 130 includes a secondary duct 180, alternately referred to as a secondary passage. A secondary flowpath 115 branches from the bypass airflow 114 and enters the secondary duct 180 in the convergent region 136. The secondary duct 180 passes through the body of the engine nacelle 120 and exits at a secondary duct convergent-divergent exit nozzle 190 positioned in the divergent region 138, and axially upstream of an exit nozzle 170 of the primary duct 130 relative to an axis defined by the gas turbine engine. The angle of the inlet to the secondary duct 180 and the exit nozzle 190 of the secondary duct 180 can be selected by one of skill in the art, having the benefit of this disclosure, to optimize the effect that the secondary duct 180 has on the flow separation at the divergent region 138 of the bypass duct convergent-divergent exit nozzle 134.

With continued reference to FIG. 2A, and with like numerals indicating like elements, FIG. 2B illustrates a variation of convergent-divergent exit nozzle 134 of the example gas turbine engine 100 of FIG. 2A. The variation of FIG. 2B shifts the convergent-divergent exit nozzle 190 axially, such that the convergent-divergent exit nozzle 190 and the exit nozzle 170 of the primary duct 130 are in the same axial position, relative to an axis defined by the gas turbine engine 100. In all other aspects, the convergent-divergent nozzles of FIGS. 2A and 2B are identical.

Figure 3A:
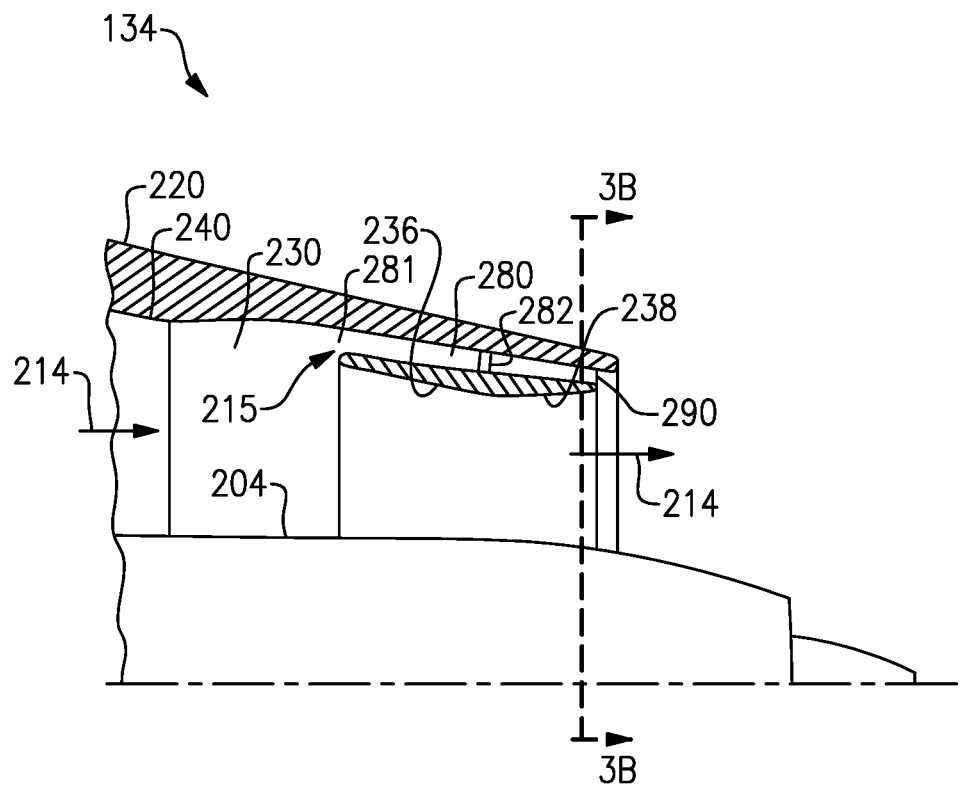
FIG. 3A schematically illustrates a partial side view of a first alternate example bypass duct convergent-divergent exit nozzle.
Figure 3B:
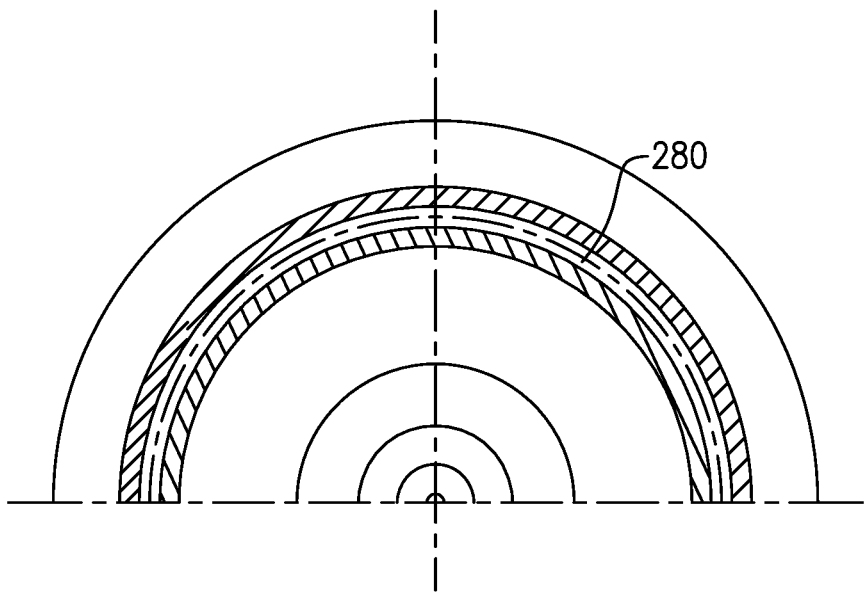
FIG. 3B schematically illustrates an axially oriented cross section view of the structure of FIG. 3A.

With continued reference to FIGS. 2A and 2B, and with like numerals indicating like elements, FIGS. 3A and 3B illustrate a partial cross section of one example convergent-divergent exit nozzle 134, with FIG. 3A being a cross sectional side view and FIG. 3B being an axially aligned cross sectional view along view line 3B (illustrated in FIG. 3A). As with the example of FIG. 2A, the nozzle exit 134 includes a convergent region 236, where the outer diameter 240 of the duct 230 converges toward the inner diameter 204, and a divergent region 238, where the outer diameter 240 of the duct 230 diverges away from the inner diameter 204.

A secondary bypass duct 280 includes an inlet 281 in the convergent region 236 of the convergent-divergent exit nozzle 134 and an outlet 290 in the divergent region 238 of the convergent-divergent exit nozzle 134. The inlet 281 branches a portion of the air from the bypass airflow 214 into the secondary duct 280 along a secondary flowpath 215. The exemplary secondary duct 280 of FIGS. 3A and 3B forms a circumferential ring around a radially inward portion of the nacelle 220, and is referred to as a circumferential ring duct. In some examples, static supports 282 are included within the secondary duct 280 to maintain the relative positions between the main nacelle 220 and the portion of the convergent-divergent exit nozzle 134 that is radially inward of the secondary duct 280. In alternative examples, the relative positions of the portion of the convergent-divergent nozzle 234 and the nacelle 220 are maintained using static supports exterior to the secondary duct 280, leaving the secondary duct completely free of obstructions.

FIG. 3B provides a cross sectional view of the convergent-divergent exit nozzle 134 of FIG. 3A along view line 3B. The cross sectional view illustrates the ring shaped geometry of the secondary duct 280, omitting any structural supports 282 within the secondary duct 280 for clarity purposes.

Figure 4A:
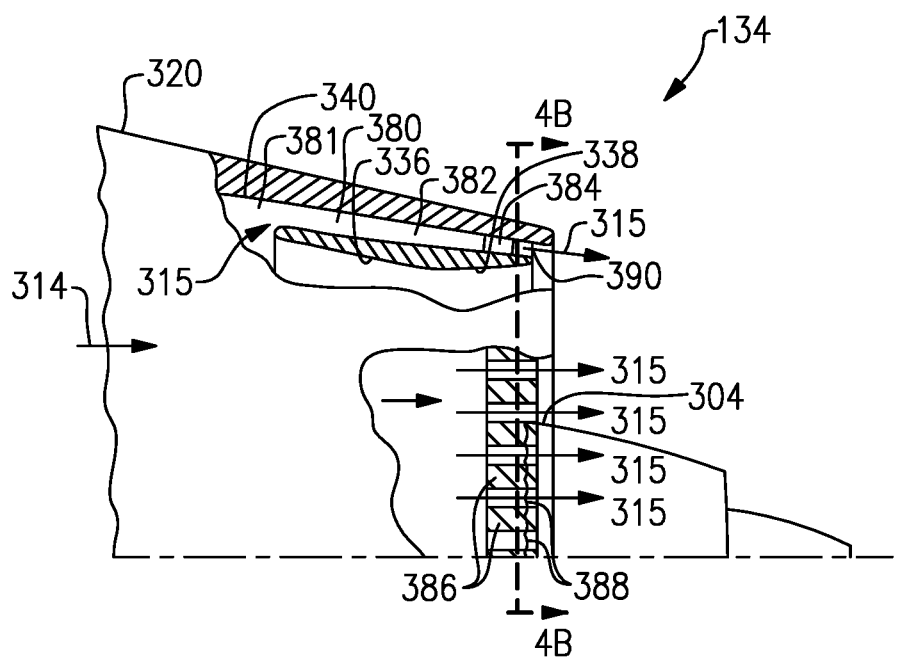
FIG. 4A schematically illustrates a partial side view of a second alternate example bypass duct convergent-divergent exit nozzle.
Figure 4B:
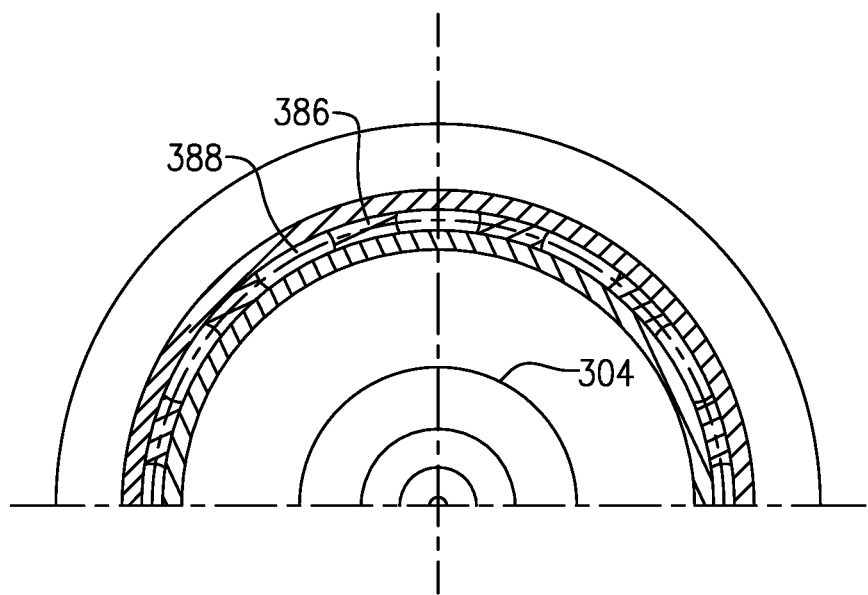
FIG. 4B schematically illustrates an axially oriented cross section view of the structure of FIG. 4A.

With continued reference to FIGS. 2, 3A and 3B, and with like numerals indicating like elements, FIGS. 4A and 4B illustrate a partial cross section of an alternative example convergent-divergent exit nozzle 134, with FIG. 4A being a cross sectional side view and FIG. 4B being an axially aligned cross sectional view along view line 4B (illustrated in FIG. 4A). As with the example of FIG. 3, a bypass duct 130 (illustrated in FIG. 2A) is defined between an outer diameter 340 and an inner diameter 304, with the outer diameter 340 of the bypass duct 130 being the inner diameter of the nacelle 320. The nozzle exit 134 includes a convergent region 336, where the outer diameter 340 of the duct 130 converges toward the inner diameter 304 of the core and a divergent region 338, where the outer diameter 340 of the duct 130 diverges away from the inner diameter 304 of the duct 130.

A secondary bypass duct 380 includes an inlet 381 in the convergent region 336 of the convergent-divergent exit nozzle 134 and an outlet 390 in the divergent region 338 of the convergent-divergent exit nozzle 134. The inlet 381 branches a portion of the air from the bypass airflow 314 into the secondary duct 380 along airflow passages 315. In the example of FIGS. 4A and 4B, the secondary duct 380 includes a circumferential ring portion 382 and a divided duct portion 384. The circumferential ring portion 382 is a single duct that extends a full circumference of the gas turbine engine 20 (illustrated in FIG. 1). Aft of the circumferential ring portion 382, relative to fluid flow, is a divided duct portion 384. The divided duct portion 384 includes multiple structures 386 that are disposed circumferentially about the secondary duct and divide the airflow passages 315 through the secondary duct 380 into multiple individual flowpaths 388. The structures 386 and the individual flowpaths 388 are disposed downstream of the circumferential ring portion of the secondary duct 380. In some examples, the structures 386 include aerodynamic features or profiles designed to import specific desired flow properties on air entering the divided duct portion 384.

The circumferentially spaced structures 386 and the corresponding divided airflow passages 315 illustrated in the example of FIGS. 4A and 4B are exaggerated in size for illustrative effect. In a practical engine, the structures 386 and the airflow passages 315 can be sized by one of skill in the art to include any number of structures 386, and any size airflow passages 315, depending on the needs of a particular engine design. As can be seen in FIG. 4B, each of the structure 386 and the divided flowpaths 388 form an alternating structure 386 flowpath 388 arrangement spaced circumferentially about the convergent divergent exit nozzle 134. While illustrated herein as evenly distributed structures 386, and uniformly sized structures 386 and passages 388, it is understood that sizing and spacing can be altered and still fall within this disclosure.

In addition to dividing the airflow passages 315 into multiple passages 388, in some examples the structures 386 support the portion of the convergent-divergent exit nozzle 134 that is radially inward of the secondary duct 380 relative to the main nacelle 320 body.

Figure 5:
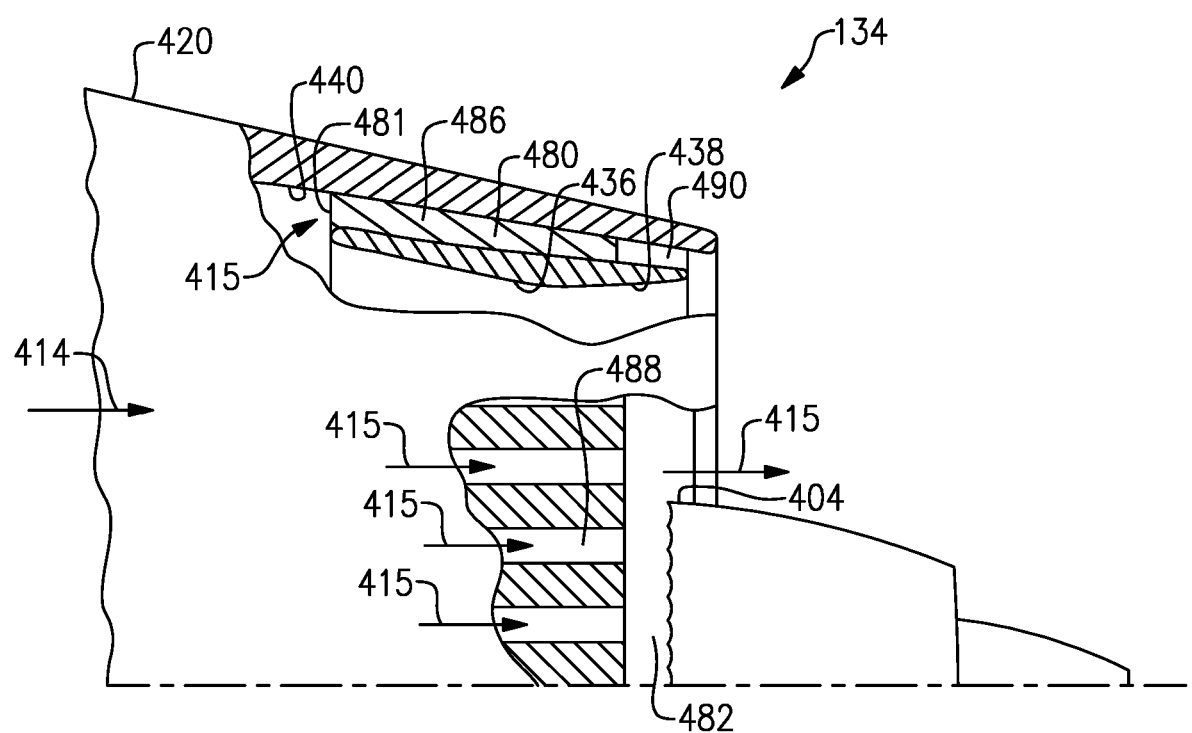
FIG. 5 schematically illustrates a partial side view of a third alternate example bypass duct convergent-divergent exit nozzle.

With continued reference to FIGS. 1-4B, and with like numerals indicating like elements, FIG. 5 illustrates a partial cross sectional side view of an alternative example convergent-divergent exit nozzle 134. The nozzle exit 134 includes a convergent region 436, where the inner diameter 440 of the nacelle 420 converges toward the inner diameter 404 and a divergent region 438, where the inner diameter 440 of the nacelle 420 diverges away from the inner diameter 404.

A secondary bypass duct 480 includes an inlet 481 in the convergent region 436 of the convergent-divergent exit nozzle 134 and an outlet 490 in the divergent region 438 of the convergent-divergent exit nozzle 134. The inlet 481 branches a portion of the air from the bypass airflow 414 into the secondary duct 480 along a secondary flowpath 415. In the example of FIG. 5, the secondary duct 480 includes a circumferential ring shaped portion 482 and a divided duct portion. The divided duct portion is formed from multiple structures 486 disposed circumferentially about the secondary duct 480, with each of the structures extending a portion of the axial length of the secondary duct 480. The circumferential ring shaped portion 482 is positioned aft of the divided duct portion relative to fluid flow along the secondary flowpath 415.

As air initially enters the divided secondary flowpath 415, the air is segregated into the airflow passages 488 defined by the structures 486, and travels along the divided flowpaths. The air is then merged into a single circumferential ring flowpath and exits the secondary duct 480. In contrast, the airflow passages 315 in the examples of FIGS. 4A and 4B enters the secondary duct 380 as a single airflow and is split by the structures 386 to form multiple airflows.

With reference to both FIGS. 4A and 5, the particular axial length of the structures 386, 486 defining the divided duct portion 384, 484 can be determined by one of skill in the art, having the benefit of this disclosure, in light of the particular needs and requirements of a given engine. In each of the examples of FIGS. 4A and 5, the structures 386, 486 support the radially inward portion of the convergent-divergent portion of the convergent-divergent exit nozzle 134 relative to the main nacelle 320 body.

Figure 6:
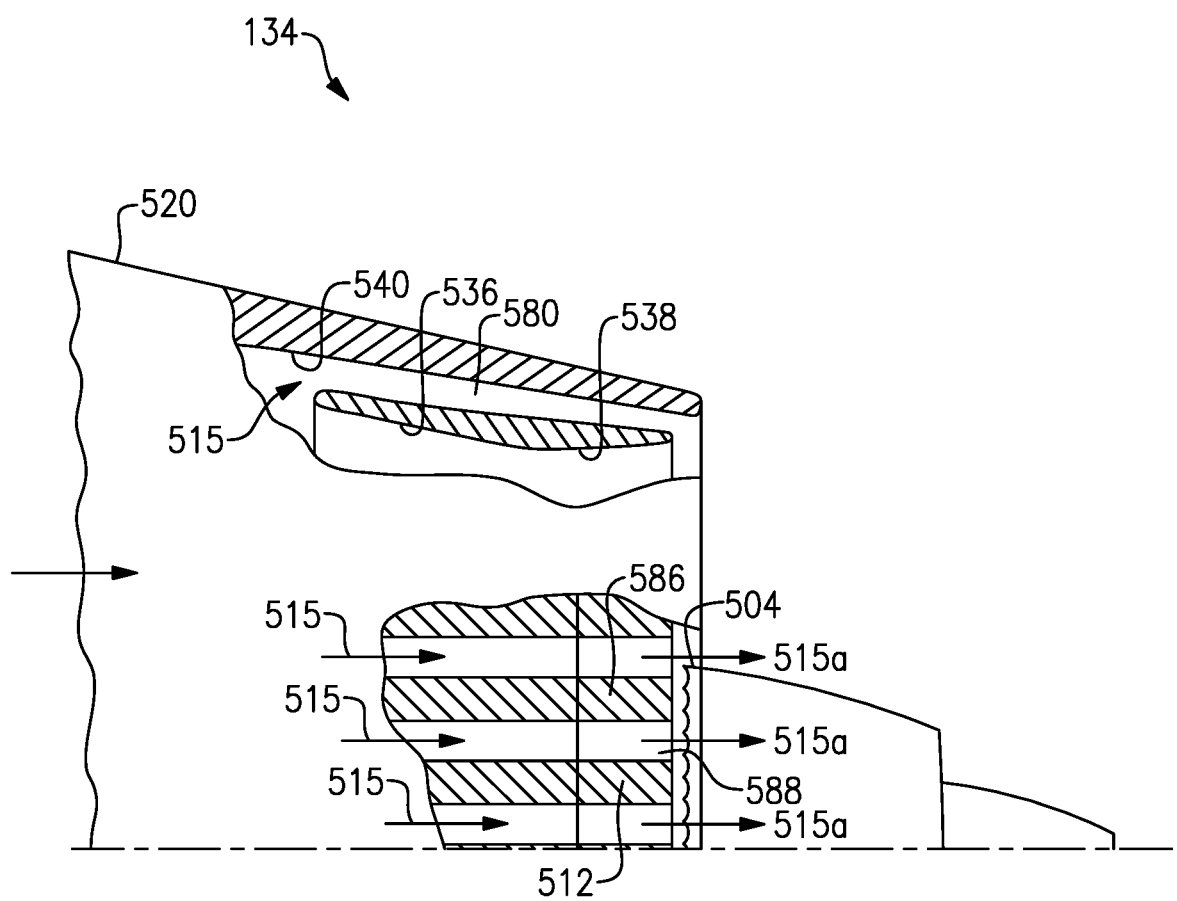
FIG. 6 schematically illustrates a partial side view of a fourth alternative example bypass duct convergent-divergent exit nozzle.

With continued reference to FIGS. 1-5, and with like numerals indicating like elements, FIG. 6 illustrates a partial cross sectional side view of an alternative example convergent-divergent exit nozzle 134. The exit nozzle 134 includes a convergent region 536, where the inner diameter 540 of the nacelle 520 converges toward the inner diameter 504 and a divergent region 538, where the inner diameter 540 of the nacelle 520 diverges away from the inner diameter 504.

Unlike the examples of FIGS. 4A, 4B and 5, the secondary duct 580 in the example convergent-divergent exit nozzle 134 of FIG. 6 includes structures 586 extending the full axial length of the secondary duct 580. The structures 586 effectively separate the airflow 515 entering the secondary duct into individual airflows 515a, each of which exits the secondary duct in the divergent region of the convergent-divergent exit nozzle 134. As with the previous examples, the structures 586 support the portion of the convergent-divergent exit nozzle 134 that is radially inward of the secondary duct relative to the remainder of the nacelle 520. In some examples, each of the individual flow paths 588 passes through a separate nozzle 512 region defined by the structures 586 adjacent the flow path 588.

Furthermore, one of skill in the art, having the benefit of this disclosure, will recognize that the example embodiments of FIGS. 3A, 3B, 4A, 4B, 5 and 6 can be adapted to include the axially aligned exit nozzles illustrated in FIG. 2B, without requiring additional modification to the example embodiments.

It is further understood that any of the above described concepts can be used alone or in combination with any or all of the other above described concepts. Although an embodiment of this invention has been disclosed, a worker of ordinary skill in this art would recognize that certain modifications would come within the scope of this invention. For that reason, the following claims should be studied to determine the true scope and content of this invention.

The invention claimed is:

1. A gas turbine engine comprising:
   an engine core and a fan driven by the engine core;
   a nacelle radially surrounding the engine core and the fan;
   a bypass passage including a convergent-divergent exit nozzle, the bypass passage being defined by the nacelle at an outer diameter of the bypass passage and by an outer diameter of the engine core at an inner diameter of the bypass passage, wherein the convergent-divergent exit nozzle includes:
   a primary passage and a secondary passage radially exterior to the primary passage, wherein the secondary passage includes a secondary passage inlet disposed in a convergent region of the convergent-divergent exit nozzle, a secondary passage outlet disposed in a divergent region of the convergent-divergent exit nozzle, and wherein the secondary passage includes a circumferential ring duct and a plurality of isolated airflow passages; and wherein the plurality of isolated airflow passages are aft of the circumferential ring duct, relative to a fluid flow through the secondary passage, and wherein each of the plurality of isolated airflow passages are directly connected to the secondary passage outlet.

2. A gas turbine engine comprising:

an engine core and a fan driven by the engine core;

a nacelle radially surrounding the engine core and the fan;

a bypass passage including a convergent-divergent exit nozzle, the bypass passage being defined by the nacelle at an outer diameter of the bypass passage and by an outer diameter of the engine core at an inner diameter of the bypass passage, wherein the convergent-divergent exit nozzle includes:

a primary passage and a secondary passage radially exterior to the primary passage, wherein the secondary passage includes a secondary passage inlet disposed in a convergent region of the convergent-divergent exit nozzle, a secondary passage outlet disposed in a divergent region of the convergent-divergent exit nozzle, and wherein the secondary passage includes a circumferential ring duct and a plurality of isolated airflow passages; and wherein the secondary passage outlet of the secondary passage and an outlet of the convergent-divergent exit nozzle are axially aligned, relative to an axis defined by the gas turbine engine.

3. The gas turbine engine of claim 2, wherein each of the isolated airflow passages extend a partial length of the secondary passage.

4. The gas turbine engine of claim 3, wherein the plurality of airflow passages are fore of the circumferential ring duct, relative to a fluid flow through the secondary passage.

5. The gas turbine engine of claim 3, wherein the plurality of airflow passages are aft of the circumferential ring duct, relative to a fluid flow through the secondary passage.

6. The gas turbine engine of claim 3, wherein each of the isolated airflow passages is at least partially disposed in the divergent region of the convergent-divergent exit nozzle.

7. The gas turbine engine of claim 2, wherein the circumferential ring duct is an unobstructed circumferential ring duct.

8. The gas turbine engine of claim 2, further comprising a plurality of structures disposed circumferentially within said secondary passage, and wherein said plurality of structures supports a portion of the convergent-divergent exit nozzle, the portion being radially inward of the secondary passage.

* * * * *